US008909389B2

(12) United States Patent
Meyer

(10) Patent No.: US 8,909,389 B2
(45) Date of Patent: Dec. 9, 2014

(54) HARVESTER WITH A SENSOR MOUNTED ON AN AIRCRAFT

(75) Inventor: Axel Roland Meyer, Zweibrucken (DE)

(73) Assignee: Deere & Company, Moline, IL (US)

( * ) Notice: Subject to any disclaimer, the term of this patent is extended or adjusted under 35 U.S.C. 154(b) by 75 days.

(21) Appl. No.: 13/187,696

(22) Filed: Jul. 21, 2011

(65) Prior Publication Data
US 2012/0029732 A1 Feb. 2, 2012

(30) Foreign Application Priority Data

Jul. 29, 2010 (DE) .......................... 10 2010 038 661

(51) Int. Cl.
G05D 1/00 (2006.01)
G05D 3/00 (2006.01)
G06F 7/00 (2006.01)
G06F 17/00 (2006.01)
A01D 41/127 (2006.01)
A01D 43/08 (2006.01)
A01B 69/04 (2006.01)
A01B 79/00 (2006.01)

(52) U.S. Cl.
CPC ............ A01B 69/008 (2013.01); A01D 41/127 (2013.01); A01D 43/085 (2013.01); B64C 2201/122 (2013.01); A01B 79/005 (2013.01)
USPC ..................... 701/2; 701/50; 460/1

(58) Field of Classification Search
CPC ........ A01B 69/04; A01B 69/06; A01B 69/08; A01B 79/005; A01D 41/127; A01D 43/08; A01D 43/12; G01C 21/00; G05D 1/04; G05D 1/08
USPC ........... 701/1, 2, 3, 22, 23, 24, 25, 26, 27, 28, 701/36, 50; 460/114, 1, 13, 90, 100, 112, 460/396; 56/10.2 G, 10.2 J, 11.9, 12.9, 13.1, 56/13.3, 13.5, 13.9, 15.6, 16.6, 17.3, 2, 1, 56/14.9, 27.5, 56.28, 9, 98, 327.1, 328.1, 56/181, 208, 220, 226
See application file for complete search history.

(56) References Cited

U.S. PATENT DOCUMENTS 4,205,468 A * 6/1980 Greider .............................. 37/43
5,646,844 A * 7/1997 Gudat et al. ................... 701/409

(Continued)

FOREIGN PATENT DOCUMENTS

DE 4403893 8/1995
DE 4426059 2/1996

(Continued)

OTHER PUBLICATIONS

Swain; K.C. et al. Estimation of Rice Yield and Protein Content Using Remote Sensing Images Acquired by Radio Controlled Unmanned Helicopter. American Society of Agricultural and Biological Engineers. Written for presentation at the 2008 ASABE Annual International Meeting, Jun. 29-Jul. 2, 2008. Retrieved from the internet: <http://asae.frymulti.com/azdez.asp?JID=5&AID=24673&CID=prov2008&v=&i=&T=1&refer=7&access=>.

(Continued)

Primary Examiner — Khoi Tran
Assistant Examiner — Rachid Bendidi
(74) Attorney, Agent, or Firm — Yee & Associates, P.C.

(57) ABSTRACT

A sensor for monitoring a plant population in front of a harvester and a transfer process of the crop from the harvester to a transport vehicle is arranged on an unmanned aircraft. The aircraft moves in the vicinity of the harvester in the harvesting mode and communicates in a wireless fashion with a control unit that controls an actuator for influencing an operating parameter of the harvester and/or the transport vehicle (in real time based on signals of the sensor in the harvesting mode.

16 Claims, 3 Drawing Sheets

(56) References Cited

U.S. PATENT DOCUMENTS

| | | | |
|---|---|---|---|
| 6,128,574 A * | 10/2000 | Diekhans | 701/410 |
| 6,216,071 B1 * | 4/2001 | Motz | 701/50 |
| 6,236,924 B1 * | 5/2001 | Motz et al. | 701/50 |
| 6,246,932 B1 * | 6/2001 | Kageyama et al. | 701/24 |
| 6,682,416 B2 * | 1/2004 | Behnke et al. | 460/114 |
| 6,943,824 B2 | 9/2005 | Alexia et al. | |
| 7,062,381 B1 * | 6/2006 | Rekow et al. | 701/300 |
| 7,063,614 B2 * | 6/2006 | Vogelgesang et al. | 460/114 |
| 7,756,624 B2 * | 7/2010 | Diekhans et al. | 701/50 |
| 2002/0083695 A1 * | 7/2002 | Behnke et al. | 56/119 |
| 2003/0004630 A1 * | 1/2003 | Beck | 701/50 |
| 2003/0130767 A1 * | 7/2003 | Carroll | 701/3 |
| 2003/0174207 A1 * | 9/2003 | Alexia et al. | 348/89 |
| 2004/0264761 A1 * | 12/2004 | Mas et al. | 382/154 |
| 2006/0030990 A1 * | 2/2006 | Anderson et al. | 701/50 |
| 2006/0074557 A1 * | 4/2006 | Mulligan et al. | 701/213 |
| 2006/0271262 A1 * | 11/2006 | McLain, III | 701/50 |
| 2007/0037621 A1 * | 2/2007 | Isfort | 460/114 |
| 2007/0135190 A1 * | 6/2007 | Diekhans et al. | 460/1 |
| 2009/0151313 A1 * | 6/2009 | Dillon | 280/419 |
| 2009/0282794 A1 * | 11/2009 | Wilson et al. | 56/10.1 |
| 2010/0063692 A1 * | 3/2010 | Madsen et al. | 701/50 |
| 2010/0070144 A1 * | 3/2010 | Burke et al. | 701/50 |
| 2010/0070145 A1 * | 3/2010 | Foster et al. | 701/50 |
| 2010/0274452 A1 * | 10/2010 | Ringwald et al. | 701/50 |
| 2010/0332051 A1 * | 12/2010 | Kormann | 701/2 |
| 2011/0066337 A1 * | 3/2011 | Kormann | 701/50 |

FOREIGN PATENT DOCUMENTS

| | | |
|---|---|---|
| DE | 10130665 | 1/2003 |
| DE | 10224939 | 1/2004 |
| DE | 102004039462 | 1/2006 |
| DE | 102008002006 | 12/2009 |
| DE | 202008015324 | 5/2010 |
| DE | 102009027245 | 12/2010 |
| JP | 2004322836 | 4/2003 |

OTHER PUBLICATIONS

Parker, M.; Robbiano, C.; Battorf, G. Quadcopter. Department of Electrical and Computer Engineering, Colorado State University, pp. i-37, 2011, Fort Collins, CO 80523.

University of Wisconsin. To the skies: Student entrepeneur launches quadcopter. [online] Jun. 5, 2013. http://www.uww.edu/news/archive/2013-06-quadcopter [Retrieved on Jul. 23, 2013].

Aerial Precision AG. Aerial Precision AG Press Release Jun. 2013. [online] Jun. 2013. http://aparotors.com/aerial-precision-ag-press-release-june-2013/ [Retrieved on Jul. 23, 2013].

* cited by examiner

HARVESTER WITH A SENSOR MOUNTED ON AN AIRCRAFT

FIELD OF THE INVENTION

The invention relates to an assembly that comprises a harvester and at least one sensor mounted on an aircraft.

BACKGROUND ART

Agricultural harvesters are increasingly equipped with sensors, the output signals of which allow an automatic control of actuators in order to simplify the operation of the harvester for the operator. In addition to operating parameters of the harvester, such as the speeds or torques of driven, crop-conveying elements or crop-processing elements, properties of the crop, such as, e.g., the population density or the level of maturity of the plants or the position of the crop angle, are also determined with sensors in order to automatically adapt the driving speed, the steering angle and/or other operating parameters of the harvester. Sensors of this type usually operate with ultrasound or electromagnetic waves and are mounted at the highest possible point of the harvester, particularly on the roof of the cabin, in order to be able to acquire information on the crop as far in advance as possible and to adapt the operating parameters in due time before the harvester reaches the crop monitored by the sensors (DE 10 2004 039 462 A1 or DE 101 30 665 A1).

In the harvesting of agricultural crops on a field, it is furthermore common practice for a harvester to load a transport vehicle that drives next to the harvester with the harvested crop. A loading container of the transport vehicle that may consist, for example, of a tractor with trailer or a truck is loaded with the harvested crop by a discharging device of the harvester while moving, for example, by an ejection elbow of a field chopper or a tank unloading tube of a combine-harvester. The discharging device is usually mounted on the harvester such that it can be turned about a vertical axis and pivoted between an idle position, in which it is oriented approximately parallel to the longitudinal axis of the harvester, and a working position, in which it extends transverse to the driving direction of the harvester. It may also be possible to vary the height of the ejecting end of the discharging device, as well as the position of an ejection baffle that defines the angle, at which the harvested crop is discharged.

In discharging devices that are normally used on combine-harvesters and cannot be adjusted with respect to their discharging position, the driver of the transport vehicle needs to ensure that the loading container is uniformly and completely filled by gradually positioning different locations of the loading container underneath the discharging device. This task is relatively demanding and exhausting because crop losses due to the crop falling onto the field need to be avoided. It was therefore proposed to equip the transport vehicle with an automatic steering system that is based on positional data transmitted in a wireless fashion (DE 102 24 939 A1). However, the filling level of the loading container is not monitored in this case such that the driver of the harvester still needs to oversee the loading process.

In adjustable discharging devices as they are typically used on field choppers, the position of the discharging device may simply be controlled manually by the driver of the harvester. Automatic controls for the position of the discharging device have been proposed in order to prevent the position control of the discharging device from demanding a significant portion of the driver's attention and resulting in exhausting work for the driver of the harvester. These automatic controls usually comprise a sensor that is arranged on the discharging device and operates with ultrasonic waves or optically (DE 44 03 893 A1, DE 44 26 059 A1).

In the previous arrangement of the sensors for monitoring the crop on the field and/or the transfer process on the harvester, it is considered disadvantageous that said sensors are subjected to vibrations in the harvesting mode due to the driving motion over more or less uneven fields, as well as driven elements of the harvester, such that the acquisition of sufficiently sharp images or accurate data is complicated. In addition, the angle, at which the sensor points at the plant population or the transfer process, is very unfavorable in many instances, particularly if the sensor points relatively far ahead in order to acquire data in advance. This also applies to transfer processes to carts with high walls because the sensor arranged on the discharging device does not detect the crop deposited in the loading container until a relatively high filling level is reached shortly before the loading container is completely filled.

In agricultural engineering, the utilization of remotely piloted aircraft, particularly rotary-wing aircraft, was until now only proposed for monitoring the harvest and protein content of rice plants so as to determine suitable fertilizer quantities (ASABE Paper No. 080038), for inspecting agricultural fields for harmful weeds (DE 20 2008 015 324 U1) or for spraying insecticides (JP 2004 322 836 A1).

SUMMARY

In accordance with one embodiment, an assembly for a harvester comprises at least one sensor for monitoring a plant population in front of the harvester and a transfer process of the crop from the harvester to a transport vehicle. A control unit is designed such that it controls an actuator for influencing an operating parameter of the harvester or the transport vehicle in real time based on signals of the sensor in the harvesting mode, wherein the sensor is mounted on an unmanned aircraft that is designed for moving in the vicinity of the harvester in the harvesting mode and for communicating with the control unit in a wireless fashion. Accordingly, said sensor, which is mounted on an aircraft, is not subjected to the vibrations of the harvester and points at the plant population and/or the transfer process at a more favorable angle. In one embodiment, a control unit is designed such that it controls an actuator for influencing an operating parameter of the harvester and/or the transport vehicle in real time based on signals of the sensor in the harvesting mode.

DESCRIPTION OF THE PREFERRED EMBODIMENT

Figure 1:
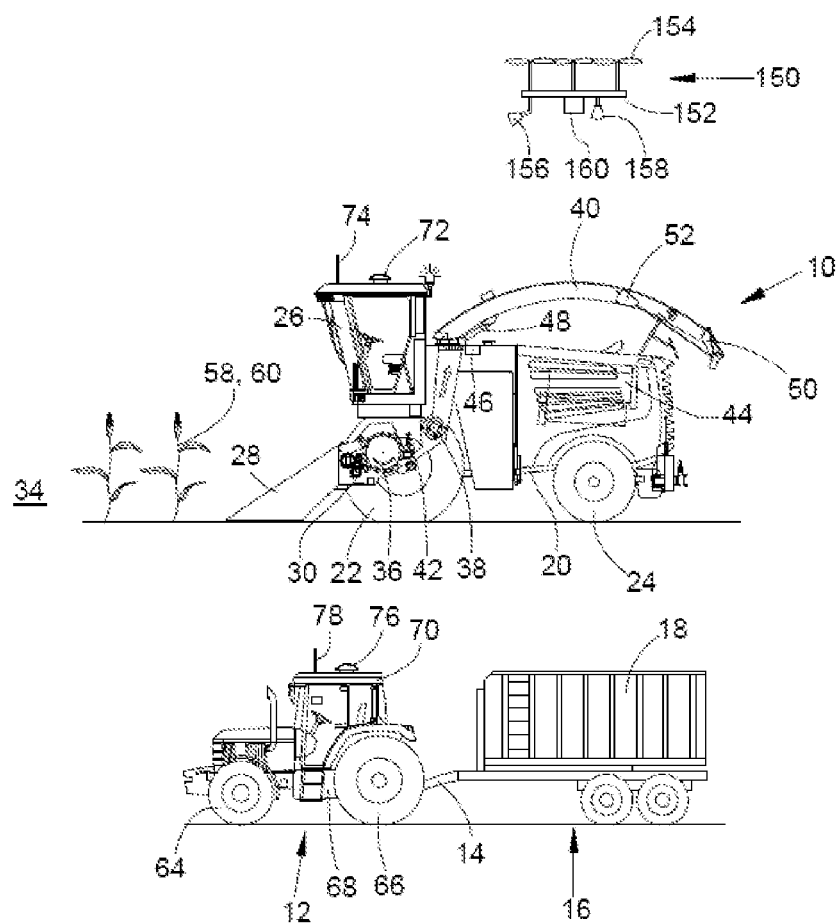
FIG. 1 shows a side view of a self-propelled harvester, a transport vehicle and an aircraft.

In accordance with one embodiment, an unmanned aircraft with a sensor is assigned, in particular, to a self-propelled, attached or towed harvester, wherein said sensor monitors the plant population in front of the harvester and/or a transfer process of the harvested crop from the harvester to a transport vehicle in the harvesting mode. The sensor generates signals that are fed to a control unit in the harvesting mode, wherein said control unit controls an actuator based on the signals. The actuator influences at least one operating parameter of the transport vehicle (particularly its steering and/or driving speed) in order to automate the transfer process and/or of the harvester in order to automate the transfer process and/or to control another operating parameter of the harvester. The signals of the sensor are processed by the control unit in real time, i.e., this does not concern values that were acquired long before the harvest, but rather signals that are generated during the harvesting process and can be intermediately stored over a certain period of time, for example, in order to compensate the delay between the time, at which the signals are registered by the sensor, and the time, at which the harvester reaches the location that corresponds to the signals. The transmission of the signals from the sensor to the control unit takes place in a wireless fashion, particularly via an optical or electromagnetic connection, in which conventional communication protocols such as Bluetooth, ZigBee or WLAN can be used.

Due to the arrangement of the sensor on the unmanned aircraft, a more favorable perspective for monitoring the crop in front of the harvester or the transfer process is achieved and the sensor is decoupled from the mechanical vibrations of the harvester.

As already described above, the control unit may control an actuator in order to control an automatic transfer of the crop from the harvester to a transport vehicle. For this purpose, the sensor monitors the transfer process and may be realized in the form of a camera or scanning range finder that operates with ultrasound or light (particularly a laser). The actuator can control the position of a transferring device and, for example, turn the transferring device about the vertical axis and/or adjust the height of its ejecting end and/or change its length and/or its discharging angle by adjusting an ejection baffle on the end of the transferring device. An actuator may additionally or alternatively control the steering and/or speed of the transport vehicle, particularly on harvesters without adjustable discharging device (as it is common practice on combine-harvesters). Since the transfer process is monitored from a relatively great height and therefore a favorable angle, it is not only possible to position the discharging device and/or the transport vehicle in such a way that the smallest possible amount of crop falls onto the field and is lost, but also to uniformly fill the loading container in a sensible time sequence and with a desired filling height (see U.S. Pat. Pub. No. 2011/0066337A1, which is incorporated into the present document by reference, and which is the U.S. counterpart of German Patent Application No. DE 10 2008 002 006 A1). It is also possible to automate the change of the transport vehicle as described in U.S. Pat. Pub. No. 2010/0332051A1, which is also incorporated into the present document by reference, and which is the U.S. counterpart of German Patent Application No. 10 2009 027 245 A1.

The one or more actuator(s) may furthermore serve for controlling the driving speed of the harvester and/or for controlling the speed of a driving motor of the harvester and/or for steering the harvester and/or for adjusting an operating parameter of a crop-conveying device and/or crop-processing device of the harvester, namely based on signals of the sensor that monitors the crop in front of the harvester. The signals of the sensor may be directly converted into control signals for the actuator by the control device or indirectly incorporated by merging the sensor signals with the signals of other onboard sensors of the harvester. In the control of harvesters, forward-pointing sensors play a more and more important role because they make it possible to react by automatically adapting the adjustments before work is required in a machine. Overloads and underloads can be prevented with this control strategy. One example is a laser scanner that can monitor the swath volume in front of a tractor towing a baling press or in front of a field chopper in order to adapt the driving speed. It is also possible to determine the population density in front of a combine-harvester and to control the driving speed, as well as to optimize the threshing adjustments by determining the moisture.

The signals of the sensor can also be used by the control unit for planning a route of the harvester. For this purpose, it is preferred that the aircraft initially flies over and maps the field from a sufficient height (i.e., a greater height than during harvesting) in order to prepare the route plan. This makes it possible to drive around immovable obstacles (such as larger rocks) or movable obstacles (e.g., animals) or areas of a field that are not suitable for harvesting, such as, e.g., waterholes with dense weed cover, or to stop the harvester in order to avoid a collision. The aircraft can also be used during the drive to the field in order to detect obstacles in advance and to drive around these obstacles (e.g., passages with insufficient height or width or severe roadway damage). In this case, only the aircraft may initially fly over and explore the planned driving route. Crop parameters determined by the sensor of the aircraft such as, for example, the plant size, the level of maturity, the moisture, the protein content, etc., can also be taken into account during the preparation of the route plan in order to collect largely homogenous (or well mixed) crop qualities in the individual load containers.

Depending on the respective application, the evaluation of the sensor signals into control signals for the actuator or the actuators may be realized with a control unit in the aircraft or an onboard control unit of the harvester. It would also be conceivable to provide the aircraft with an onboard control unit in order to pre-process the signals of the sensors and to transmit only smaller data quantities to a control unit of the harvester.

The onboard sensor of the aircraft may be realized in the form of a black and white or color camera for visible light, the sensitive range of which can be expanded to near infrared in order to better detect the chlorophyll of plants. The sensor may also consist of an optical spectrometer that is preferably realized in the form of a scanning spectrometer. The aircraft may furthermore comprise a range finder that operates with acoustic or optical waves and preferably is also realized in the form of a scanning range finder.

The aircraft preferably comprises a flight control that automatically controls its flight path. For this purpose, it would be possible, in particular, to utilize signals of a satellite-based positioning system and/or an inertial navigation system and/or signals of a sensor, particularly a camera that recognizes, for example, the field boundaries or contours of the harvester on the field. The altitude can be controlled by means of a range finder interacting with the ground. The flight control specifications, i.e., the nominal values for its position and orientation, preferably originate from the control unit.

The aircraft may be equipped with a transmitting and receiving device that serves as a relay station and allows a time-delayed communication (i.e., the data to be transmitted initially is buffered and not sent until the aircraft comes within range of a stationary transmitting and receiving unit) or a synchronous communication between a transmitting and receiving device of the harvester and/or the transport vehicle and a remote station. In this case, the relatively high and therefore favorable position of the aircraft is once again utilized for increasing the communication range or for lowering the transmitting power.

The aircraft may be realized as an aircraft with fixed wings or as a rotary-wing aircraft, for example, a helicopter or gyrocopter or quadrocopter.

FIG. 1 shows a harvester 10 in the form of a self-propelled field chopper and a transport vehicle 12 in the form of a self-propelled tractor that tows a trailer 16 with a loading container 18 by means of a drawbar 14. An unmanned aircraft 150 is furthermore provided. The harvester 10 could also consist of any other self-propelled harvester such as a combine-harvester or a beet lifter.

The harvester 10 is constructed on a frame 20 that is carried by driven front wheels 22 and steerable rear wheels 24. The harvester 10 is operated from a driver's cab 26, from which a harvesting header 28 in the form of a corn cutter is visible, wherein said corn cutter is mounted on an infeed channel 30 on the front side of the field chopper 10. The crop taken in from the field 34 by means of the harvesting header 28 is fed to a chopping drum 36 by means of an infeed conveyor that is arranged in the infeed channel 30 and features compression rollers, wherein said chopping drum chops the crop into small pieces and delivers these pieces to a blower 38. A secondary shredder 42 with two grain-processing rollers extends between the chopping drum 36 and the blower 38. The drive of the aforementioned drivable modules of the harvester 10 and the harvesting header 28 is realized with an internal combustion engine 44. The material discharged by the blower 38 is transferred from the harvester 10 to the loading container 18 driving adjacent thereto by means of a discharging device 40 in the form of an ejection elbow that can be turned about an approximately vertical axis by means of a first power-operated actuator 46 and adjusted with respect to its incline by means of a second power-operated actuator 48, wherein the ejecting direction of said discharging device can be varied with the aid of a baffle 50, the incline of which can be adjusted by means of a third power-operated actuator 52.

The transport vehicle 12 and the trailer 16 have a conventional design. The transport vehicle 12 comprises steerable front wheels 64 and driven rear wheels 66 that are supported on a frame 68 carrying a driver's cab 70.

Figure 2:
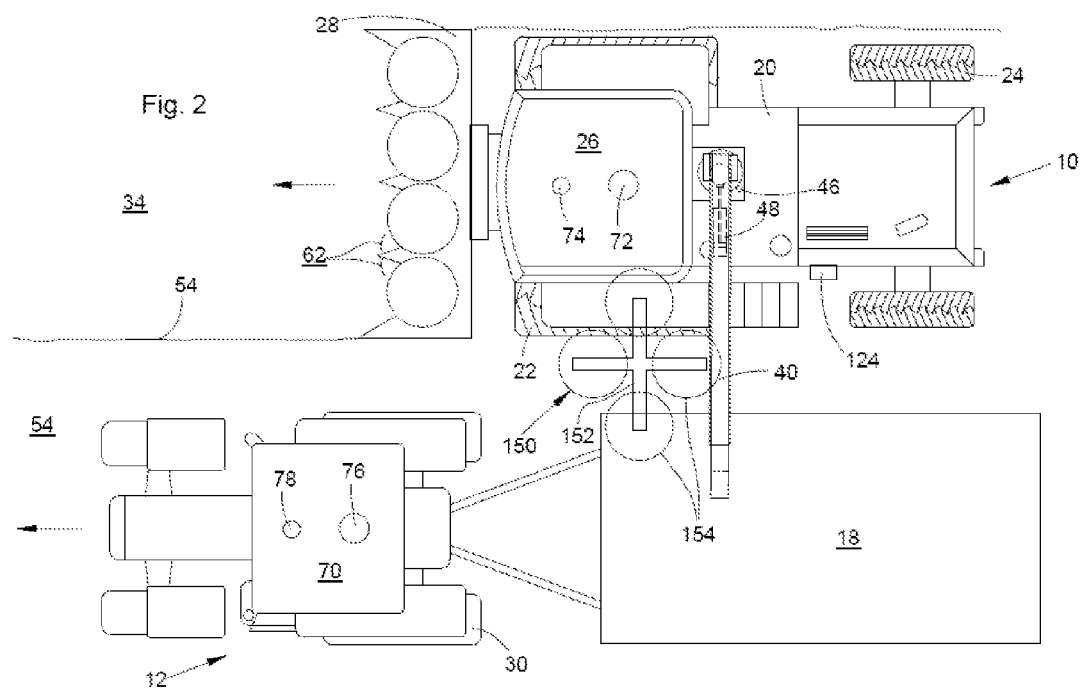
FIG. 2 shows a schematic top view of the harvester, the aircraft and the transport vehicle that jointly carry out a harvesting and transfer process on a field.

In FIG. 2, the harvester 10 and the transport vehicle 12 are illustrated in the form of a top view. This figure shows that the harvester 10 drives along a crop edge 54 that represents the boundary between the already harvested area 56 of the field 34 and the population 60 of corn plants 58 that still stands on the field 34 and harvests the plants 58 during this process. The transport vehicle 12 drives parallel to the harvester 10 on the already harvested area 56 of the field, namely along a route, on which the plants chopped by the harvester 10 are transferred into the loading container 18 by the discharging device 40. The transport vehicle 12 therefore always needs to drive adjacent to the harvester 10 in a parallel fashion; however, the transport vehicle 12 may also drive behind the harvester 10, particularly when first driving onto a field, because an already harvested area 56 of the field 34, on which the transport vehicle 12 could drive without damaging the plants standing thereon, does not yet exist at this point.

The harvester 10 is equipped with a first positioning device 72 arranged on the roof of the cab 26. A first radio antenna 74 is also positioned at this location. The transport vehicle 12 is equipped with a second positioning device 76 situated on the roof of the cab 70. A second radio antenna 78 is also positioned at this location.

Figure 3:
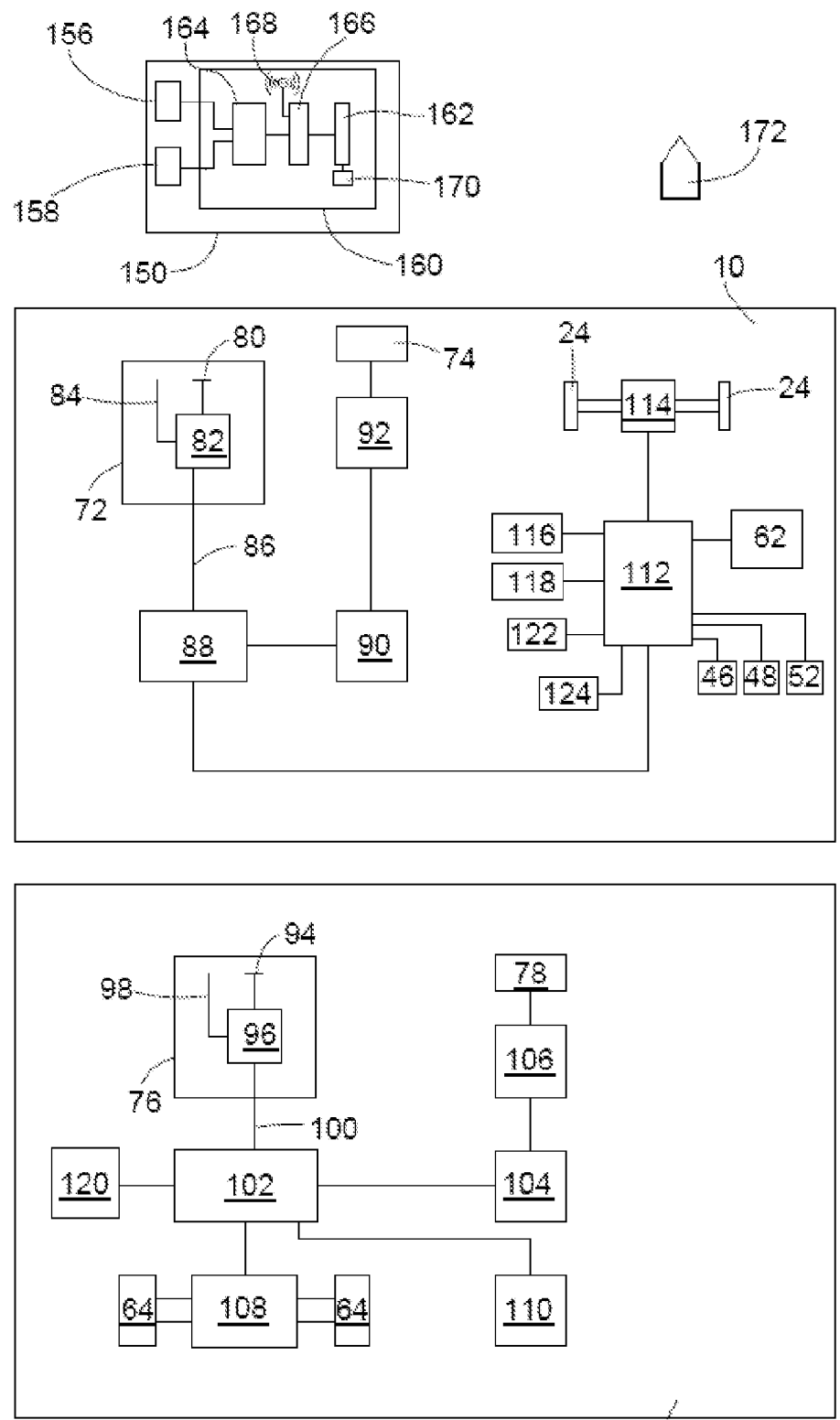
FIG. 3 shows a schematic representation of the control units of the two vehicles and the aircraft, as well as of the elements cooperating therewith.

The aircraft 150 comprises a supporting structure 152 in the form of a frame, on which a total of four propellers 154 that can be rotatively driven about the vertical axis are arranged, i.e., the aircraft is realized in the form of a so-called quadrocopter. It would also be possible to provide any other number of propellers 154. On its underside, the structure 152 carries two sensors 156, 158 and an electronics unit 160 that comprises a flight control 162, a data processing unit 164 and a transmitting and receiving unit 166 connected to an antenna 168 (see FIG. 3). The flight control 162 is connected to a positioning device 170.

In this case, the first sensor 156 is realized in the form of a camera that points onto the field in front of the harvester 10. The second sensor 158 consists of a camera that points into the loading container 18 and at the end of the discharging device 40. The data processing unit 164 processes the video signals of the sensors 156, 158 and transmits the processed data to a control unit 112 of the harvester 10 by means of the transmitting and receiving unit 166. This data comprises information that is generated by means of the sensor 156 and concerns the population density on the field 34 in front of the harvester 10 and the position of the crop edge 54, as well as information that is derived from the signals of the sensor 158 and concerns the coordinates of the edge of the loading container 18, the filling heights of the loading container 18 along its length and width and the point of impact of the crop in the loading container 18. It would also be conceivable to carry out the processing of the signals of the sensors 156, 158 aboard the harvester 10 by means of the control unit 112 and to transmit unprocessed video data via the transmitting and receiving unit 166. The transmitting and receiving unit 166 can also transmit data from the aircraft 150 or the harvester 10.or the transport vehicle 12 to a remote station 172, from which the harvesting process can be monitored.

The flight control 162 serves for realizing a certain position and orientation of the aircraft 150 by suitably controlling the propellers 154, wherein the signals of the positioning device 170 serve for determining the current position of the aircraft 150 and therefore as actual values. Corresponding control data for the nominal values of the position and orientation of the aircraft 150 is received by the control unit 112 of the harvester 10 via the transmitting and receiving unit 166.

The first positioning device 76 that is identical to the positioning device 170 of the aircraft 150 and comprises an antenna 80 and an evaluation circuit 82 connected to the antenna 80 is situated aboard the harvester 10. The antenna 80 receives signals from satellites of a positioning system, such as GPS, Galileo or Glonass, and these signals are fed to the evaluation circuit 82. The evaluation circuit 82 determines the current position of the antenna 80 based on the signals of the satellites. The evaluation circuit 82 is furthermore connected to an antenna 84 for receiving correction data that receives radio waves emitted by reference stations at known locations. Based on these radio waves, the evaluation circuit 82 generates correction data for improving the accuracy of the positioning device 72.

The evaluation circuit 82 transmits its positional data to a control unit 112 via a bus line 86. An interface 90 connects the control unit 112 to a receiving and transmitting device 92 that is connected, in turn, to the radio antenna 74. The receiving and transmitting device 92 receives and generates radio waves that are emitted and received via the antenna 74.

Analogously, the second positioning device 76 that comprises an antenna 94 and an evaluation circuit 96 connected to the antenna 94 is situated aboard the transport vehicle 12. The antenna 94 receives signals from satellites of the same positioning system as the antenna 80 and these signals are fed to the evaluation circuit 96. The evaluation circuit 96 determines the current position of the antenna 94 based on the signals of the satellites. The evaluation circuit 96 is furthermore connected to an antenna 98 for receiving correction data that receives radio waves emitted by reference stations at known locations. Based on these radio waves, the evaluation circuit 96 generates correction data for improving the accuracy of the positioning device 76.

The evaluation circuit 96 transmits its positional data to a control unit 102 via a bus line 100. An interface 104 connects the control unit 102 to a receiving and transmitting device 106 that is connected, in turn, to the radio antenna 78. The receiving and transmitting device 106 receives and generates radio waves that are emitted and received via the antenna 78. The receiving and transmitting devices 90, 106 and the radio antennas 74, 78 make it possible to transmit data from the control unit 112 to the control unit 102 and vice versa. The connection between the radio antennas 74, 78, 168 may consist of a direct connection, e.g., in an authorized radio range such as CB radio, or may be realized with one or more relay stations, for example, if the receiving and transmitting devices 90, 106, 166 and the radio antennas 74, 78, 168 operate in accordance with the GSM standard or another suitable standard for mobile telephones.

The control unit 102 is connected to a steering device 108 that controls the steering angle of the steerable front wheels 64. In addition, the control unit 102 transmits speed signals to a speed control device 110 that controls the speed of the transport vehicle 12 by varying the engine speed of the transport vehicle 12 and/or the transmission ratio. The control unit 102 is furthermore connected to a permanent memory 120.

Aboard the harvester 10, the control unit 112 is connected to a steering device 114 that controls the steering angle of the steerable rear wheels 24. In addition, the control unit 112 transmits speed signals to a speed control device 116 that controls the speed of the harvester 10 by varying the transmission ratio. The control unit 112 is furthermore connected to a throughput sensor 118 that determines the distance between the compression rollers in the infeed channel, a sensor for determining the position of sensing bands 62 arranged at a divider point of the harvesting header 28, a permanent memory 122 and actuators 46, 48 and 50.

During the harvesting process, the control unit 112 transmits data with respect to the current position of the harvester 10 to the flight control 170 via the interface 90, the receiving and transmitting device 92 and the transmitting and receiving unit 166. The flight control controls the aircraft 150 in such a way that it is always positioned at a constant height of a few meters above the harvester 10, namely slightly in front of the ejecting end of the discharging device 40 in the forward direction and between the harvester 10 and the transport vehicle 12 in the lateral direction.

The speed of the harvester 10 is controlled by the control unit 112 based on the signals of the throughput sensor 118 and the signals of the sensor 156 that are fed to the control unit 112 via the data processing unit 164, the transmitting and receiving unit 166, the receiving and transmitting device 92 and the interface 90. The control unit 112 takes into account the delay between the time, at which the plants 58 are registered by the respective sensors 118, 156, and the time, at which the plants are taken in by the harvester 10, and merges the signals of the sensors 118 and 156 in order to deliver a suitable control signal to the speed control device 116.

The harvester 10 is steered based on the signals of the sensor 156 that contain information on the position of the crop edge 54. They are merged with signals of the aforementioned sensor for determining the position of sensing bands 62 arranged at the divider point of the harvesting header 28, namely with consideration of the different measured positions of the crop edge 54 in the forward direction, and serve for controlling the steering device 114.

The signals of the sensor 158 that were pre-processed by the data processing unit 164 are also fed to the control unit 112. Based on these signals, the control unit 112 generates steering and speed signals for the transport vehicle 12 that are transmitted to the control unit 102 via the interface 90, the receiving and transmitting device 92, the receiving and transmitting device 106 and the interface 104 in order to move the loading container 18 into the respectively optimal position. The signals of the positioning device 76 may also be taken into account in this case. In addition, the control unit 112 controls the actuators 46, 48, 52 in order to move the discharging device 40 into the respectively optimal position.

The arrangement of the sensors 156, 158 on the unmanned aircraft 150 decouples the sensors 156, 158 from the vibrations, to which they would be subjected aboard the harvester 10. Their perspective of the field and the transfer process is also more favorable than in instances, in which they are arranged on the harvester 10. The sensors 156, 158 may also consist of different sensor types, for example, of laser range finders or spectrometers that preferably are respectively realized in a scanning fashion. As described above, their output signals may also serve for automatically controlling other operating parameters of the harvester 10, for example, for adjusting the chopping length based on plant parameters (e.g., level of maturity) determined by means of sensors. The aircraft 150 may also fly over a field at a greater height than illustrated in FIG. 1 before the harvesting process begins in order to generate a map, based on which the control unit 112 prepares a route to be driven. In this respect, it is possible to drive around unsuitable areas of a field, e.g., areas with a dense weed cover or dried up areas, and other obstacles. The route can also be prepared in such a way that only homogenous (or well mixed) crop qualities are deposited in the individual loading containers 18.

Having described the preferred embodiment, it will become apparent that various modifications can be made without departing from the scope of the invention as defined in the accompanying claims.

The following is claimed:

1. An assembly for a harvester, the assembly comprising:
a sensor for monitoring a transfer process of the crop from the harvester to a transport vehicle, the sensor comprising a camera or a range finder;
a control unit for controlling an actuator to adjust an orientation of a transferring device of the harvester for transfer of plant material into the transport vehicle in real time based on signals of the sensor in the harvesting mode, the sensor mounted on an unmanned aircraft that is designed for moving in the vicinity of the harvester in the harvesting mode and for communicating with the control unit on the harvester in a wireless fashion, wherein the sensor on the unmanned aircraft is positioned, between the harvester and the transport vehicle in the lateral direction, at a height above that of the harvester with a favorable angle for visibility of harvested crop within a loading container associated with the transport vehicle; and
an altitude range finder on the unmanned aircraft for interacting with the ground to control an altitude of the unmanned aircraft to be generally positioned a few meters above the harvester during the harvesting mode, consistent with the height.

2. The assembly according to claim 1, wherein the actuator serves for adjusting an angle and an inclination as the orientation of the transferring device of the harvester, or for controlling an incline of a baffle associated with the transferring device for changing its ejecting direction.

3. The assembly according to claim 1, wherein the sensor facilitates mapping of the field for a route plan, and wherein the control unit is capable of planning the route to be driven by the harvester over a field based on signals of the sensor.

4. The assembly according to claim 3, wherein the control unit is capable of planning the route to be driven by the harvester in such a way that it is possible to drive around movable and immovable obstacles and areas of a field that are not suitable for harvesting during the harvest and while driving to the field.

5. The assembly according to claim 1 wherein the control unit is situated in part aboard the harvester and in part aboard the aircraft.

6. The assembly according to one of claims 1 wherein the sensor comprises the camera, or an optical spectrometer, or the range finder that operates with optical or acoustic waves.

7. The assembly according to claim 1 wherein the aircraft is equipped with a flight control that is capable of independently controlling the flight path of the aircraft, particularly based on control signals of the control unit.

8. The assembly according to claim 7, wherein the flight control is capable of controlling the flight path based on signals of a satellite-based positioning system, or an inertial navigation system, or signals of the sensor.

9. The assembly according to claim 1 wherein the aircraft is equipped with a transmitting and receiving device that serves as a relay station and allows a time-delayed or synchronous communication between a transmitting and receiving device of the harvester and the transport vehicle and a remote station.

10. The assembly according to claim 1 wherein the aircraft consists of a rotary-wing aircraft such as, for example, a helicopter, a gyrocopter or a quadrocopter.

11. The assembly according to claim 1 wherein a speed control device is configured for controlling the driving speed of the harvester or for controlling the speed of a driving motor of the harvester based on signals of the sensor.

12. The assembly according to claim 1 wherein a steering device is configured for steering the harvester based on signals of the sensor.

13. The assembly according to claim 1 wherein another actuator is configured for adjusting an operating parameter of a crop-conveying device or crop-processing device of the harvester.

14. A system for harvesting of crop, the system comprising:
a harvester for harvesting a crop in a field;
an unmanned aircraft configured for moving above the field in the vicinity of the harvester;
a first sensor for monitoring plant density in front of the harvester, the first sensor mounted on the unmanned aircraft, the second sensor comprising a camera or a range finder;
a second sensor for monitoring a transfer process of the crop from the harvester to a transport vehicle, the second sensor mounted on the unmanned aircraft, the second sensor comprising a camera or a range finder;
a control unit for controlling an actuator to adjust an orientation of a transferring device of the harvester for transfer of plant material into the transport vehicle based on signals of the second sensor, wherein the second sensor on the unmanned aircraft is positioned, between the harvester and the transport vehicle in the lateral direction, at a height above that of the harvester with a favorable angle for visibility of harvested crop within a loading container associated with the transport vehicle;
an altitude range finder on the unmanned aircraft for interacting with the ground to control an altitude of the unmanned aircraft to be generally positioned a few meters above the harvester during the harvesting mode, consistent with the height; and
a plurality of wireless communication devices on the harvester and the unmanned aircraft for communicating with the control unit on the harvester in a wireless fashion.

15. The system according to claim 14 wherein the actuator comprises a first actuator to adjust an angle of the transferring device about a generally vertical axis and a second actuator to adjust an inclination of the transferring device of the harvester.

16. The system according to claim 15 wherein the actuator comprises a third actuator to adjust an incline of a baffle associated with the transferring device for changing its ejecting direction.

* * * * *